US008131139B1

(12) United States Patent
Gupta

(10) Patent No.: US 8,131,139 B1
(45) Date of Patent: Mar. 6, 2012

(54) ENCAPSULATED HEATING SYSTEM

(75) Inventor: Bosonto K. Gupta, Miami, FL (US)

(73) Assignee: Michael A. Valles, Braselton, GA (US)

( * ) Notice: Subject to any disclaimer, the term of this patent is extended or adjusted under 35 U.S.C. 154(b) by 373 days.

(21) Appl. No.: 12/422,954

(22) Filed: Apr. 13, 2009

(51) Int. Cl.
*A47J 27/00* (2006.01)
*F24H 7/02* (2006.01)

(52) U.S. Cl. ........................................ 392/441; 392/341

(58) Field of Classification Search .................. 392/441, 392/442–464, 341
See application file for complete search history.

(56) References Cited

U.S. PATENT DOCUMENTS 3,497,677 A * 2/1970 Blain ............................ 219/523
4,068,116 A * 1/1978 McKinstry .................... 219/523
4,124,793 A * 11/1978 Colman ........................ 219/523
4,848,616 A * 7/1989 Nozaki .................... 204/196.11
4,972,067 A 11/1990 Lokar et al.
5,109,474 A * 4/1992 Cameron ...................... 392/501
5,159,659 A * 10/1992 Cameron ...................... 392/501
5,305,419 A * 4/1994 Cameron ...................... 392/501
5,990,455 A * 11/1999 Scott et al. .................... 219/430

FOREIGN PATENT DOCUMENTS

WO WO9918756 4/1999

* cited by examiner

*Primary Examiner* — Daniel L Robinson
(74) *Attorney, Agent, or Firm* — George R. Reardon

(57) ABSTRACT

In various exemplary embodiments, systems and methods for encapsulated heaters are provided. A submersible, encapsulated heating system, a submersible, encapsulated heating system with a built-in thermostat, an encapsulated heat exchanger with flow-through heating, and a liquid, floating, encapsulated heating system are disclosed. The heater includes at least one heating element within the housing. The heating element is a positive temperature coefficient (PTC) of resistance heating element. The heater includes a pair of thin, flexible foil electrode strips disposed upon opposing sides of heating element, configured for flexibility to make an intimate contact with surface areas on each heating element. Within the housing, the heating element and the pair of thin, flexible foil electrode strips are encapsulated with an inert polymer to make the heater submersible. The encapsulated heater is configured to electrically heat a medium to a predetermined temperature and to maintain the temperature of the medium.

11 Claims, 10 Drawing Sheets

ENCAPSULATED HEATING SYSTEM

FIELD OF THE INVENTION

The technology described herein relates generally to the fields of electrical heating systems, metal heaters, and thermistors with positive temperature coefficient (PTC) of resistance heating elements. More specifically, the technology relates to submersible, encapsulated heating systems, immersion heating systems, submersible, encapsulated heating systems with built-in thermostats, encapsulated heat exchangers with flow-through heating, and liquid, floating, encapsulated heating systems.

BACKGROUND OF THE INVENTION

Positive temperature coefficient (PTC) of resistance heating elements are small ceramic stones with self-regulating temperature properties. Such heating elements can be utilized, for example, in heating systems. In a heating system, PTC thermistors can be placed between, and thermally coupled to, a pair of electrode plates in order to transfer heat.

Related patents known in the art include the following: U.S. Pat. No. 4,972,067, issued to Lokar et al. on Nov. 20, 1990, discloses a PTC heater assembly and a method of manufacturing the heater assembly. International Published Patent Application WO 99/18756, filed by Golan et al. on Oct. 1, 1998, discloses an immersible PTC heating device.

BRIEF SUMMARY OF THE INVENTION

In various exemplary embodiments, the technology described herein provides for encapsulated heaters. Each heater is configured for partial or complete immersion in the medium to be heated.

In one exemplary embodiment, the technology described herein provides a submersible, encapsulated heater. The submersible, encapsulated heater includes a housing; at least one heating element disposed within the housing, wherein the heating element is a positive temperature coefficient (PTC) of resistance heating element; and a pair of thin, flexible foil electrode strips disposed upon opposing sides of the at least one heating element, configured for flexibility to make an intimate contact with a plurality of surface areas on the at least one heating element, and configured for connectivity to an electrical power source. The housing can be generally tubular. The submersible, encapsulated heater is configured to electrically heat a medium to a predetermined temperature and to maintain the temperature of the medium. Each heating element disposed within the submersible, encapsulated heater is replaceable.

Within the housing, the at least one heating element and the pair of thin, flexible foil electrode strips are encapsulated, thus making the heater submersible. The inert polymer with which to encapsulate the heater can be silicone. The pair of thin flexible aluminum foil electrode strips is held securely against the at least one heating element with a thermoset adhesive. The pair of thin, flexible foil electrode strips can be comprised of aluminum strips.

The submersible, encapsulated heater can also include a polyimide film wrap, wherein the polyimide film wrap is wrapped around the at least one heating element and the pair of thin, flexible foil electrode strips disposed upon opposing sides of the at least one heating element, and wherein the polyimide film wrap is configured to provide an electrical insulation.

The submersible, encapsulated heater can also include an inert polytetrafluoroethylene outer sheath layer, disposed upon the housing of the submersible, encapsulated heater.

The housing of the submersible, encapsulated heater can be extruded aluminum. The extruded aluminum forms a generally tubular, cylindrical shape having a pair of internal members that surround the at least one heating element and the pair of thin, flexible foil electrode strips disposed upon opposing sides of the at least one heating element. The housing can further include a pair of hollow channels disposed within the extruded aluminum housing and running a length of the extruded aluminum housing, located on opposing sides and outside of the pair of internal members.

In yet another exemplary embodiment, the technology described herein provides a submersible, encapsulated heating system having a built-in thermostat. The heating system includes: a submersible, encapsulated heater and a thermostat electrically coupled to the submersible, encapsulated heater. The thermostat is encapsulated. The thermostat is configured for complete immersion. The submersible, encapsulated heater is configured to electrically heat a medium to a predetermined temperature and to maintain the temperature of the medium. Operation of the submersible, encapsulated heater can be controlled by the thermostat.

The heating system having a built-in thermostat also can include a submersible, encapsulated heater that further includes: a heater housing; at least one heating element disposed within the housing, wherein the heating element is a positive temperature coefficient (PTC) of resistance heating element; and a pair of thin, flexible foil electrode strips disposed upon opposing sides of the at least one heating element, configured for flexibility to make an intimate contact with a plurality of surface areas on the at least one heating element, and configured for connectivity to an electrical power source. Within the housing, the at least one heating element and the pair of thin, flexible foil electrode strips are encapsulated. The heater housing can be manufactured of a molded silicone.

The submersible, encapsulated heating system also can include a thermostat housing, wherein the thermostat housing comprises a silicone dongle to provide chemical resistance, the silicone dongle being tethered to the submersible, encapsulated heater by a power cable. The thermostat housing can be filled with a silicone gel.

The submersible, encapsulated heating system having a built-in thermostat can be manufactured in size compatible for being placed into a tote or a drum.

The submersible, encapsulated heater is configured to lower a viscosity of a liquid into which it is placed, thereby provided an improved dispensing of the liquid.

Operation of the submersible, encapsulated heater is controlled further by the thermostat to not exceed a predetermined safety temperature and thereby avoid combustion. Operation of the submersible, encapsulated heater is controlled further by the thermostat to not decrease below a predetermined safety temperature and thereby avoid freezing.

The heater housing and the thermostat housing are configured for placement into a liquid having a chemically reactive property.

In yet another exemplary embodiment, the technology described herein provides an encapsulated heat exchanger having flow-through heating. The heat exchanger includes: a heat exchanger housing having a flow-through chamber configured to heat a liquid to a predetermined temperature and at least one heating element disposed within at least one wall of the flow-through chamber. The heating element is a positive temperature coefficient (PTC) of resistance heating element. The heat exchanger is encapsulated and submersible.

The encapsulated heat exchanger having flow-through heating is configured to provide efficient heat transfer from the at least one heating element disposed within a wall of the flow-through chamber to the liquid in the flow-through chamber.

The liquid to be heated does not come into a contact with the at least one heating element disposed within a wall of the flow-through chamber.

The encapsulated heat exchanger having flow-through heating is waterproof and compatible for use indoors and outdoors.

The at least one wall of the flow-through chamber can include an inert polymer silicone to provide chemical resistance. The encapsulated heat exchanger is configured for placement into a liquid having a chemically reactive property.

The encapsulated heat exchanger having flow-through heating can also include a digital control unit integrally formed with the flow-through chamber of the heat exchanger housing and configured to provide control to the heat exchanger. Operation of the encapsulated heat exchanger can be controlled further by the digital control unit to maintain a specific temperature. Operation of the encapsulated heat exchanger can be controlled further by the digital control unit to not exceed a predetermined safety temperature and thereby avoid combustion.

In yet another exemplary embodiment, the technology described herein provides a liquid floating encapsulated heater. The liquid floating encapsulated heater includes: a submersible, encapsulated heater; a float coupled to the submersible, encapsulated heater and under which the submersible, encapsulated heater is suspended; and an indoor/outdoor liquid-proof power cable and navigation tether coupled to the submersible, encapsulated heater. The submersible, encapsulated heater is configured to electrically heat a medium to a predetermined temperature and to maintain the temperature of the medium. The submersible, encapsulated heater can be encapsulated in silicone. The float can be a float with a property of resistance to ultraviolet light. The indoor/outdoor liquid-proof power cable and navigation tether can be a 14 gage SJTOW cable. The liquid floating encapsulated heater further can include a ground fault plug disposed within the indoor/outdoor liquid-proof power cable. The submersible, encapsulated heater can further include at least one no-heat zone.

The liquid floating encapsulated heater can also include a heater having a heater housing; at least one heating element disposed within the housing; and a pair of thin, flexible foil electrode strips disposed upon opposing sides of the at least one heating element, configured for flexibility to make an intimate contact with a plurality of surface areas on the at least one heating element, and configured for connectivity to an electrical power source. The heating element is a positive temperature coefficient (PTC) of resistance heating element. Within the housing, the at least one heating element and the pair of thin, flexible foil electrode strips are encapsulated.

The submersible, encapsulated heater is configured for placement in a liquid in which the level of the liquid fluctuates. The submersible, encapsulated heater is configured for deicing.

The liquid floating encapsulated heater can further include an aesthetically pleasing decorative display configured for placement directly upon the float such that the liquid floating encapsulated heater, within the liquid into which it is placed, is generally and visually disguised from above.

In still yet another exemplary embodiment, the technology described herein provides a method for heating. The method for heating includes: utilizing at least one heating element, wherein the heating element is a positive temperature coefficient (PTC) of resistance heating element; attaching a pair of thin, flexible foil electrode strips on opposing sides of the at least one heating element; utilizing a heat-curable silicone adhesive to secure contact of the pair of thin, flexible foil electrode strips to the at least one heating element; and providing a pressure on the pair of thin, flexible foil electrode strips to contact with the at least one heating element. An intimate contact is made by pressure between the pair of thin, flexible foil electrode strips and the at least one heating element. Electrical conductivity between the pair of thin, flexible foil electrode strips and the at least one heating element is maintained. Thermal conductivity between the pair of thin, flexible foil electrode strips and the at least one heating element is maintained.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides for encapsulated heaters. Each heater is configured for complete or partial immersion in the medium to be heated.

Referring now to FIGS. 1 through 4, a submersible, encapsulated heater 10 is shown. (In FIGS. 5 and 6, an alternative embodiment, as heater 11, is shown, similar but only partially immersible in a liquid.) The submersible, encapsulated heater 10 is configured for complete immersion in a medium, such as a liquid, and to electrically heat that medium, to a predetermined temperature and to maintain the temperature of the medium.

Figure 1:
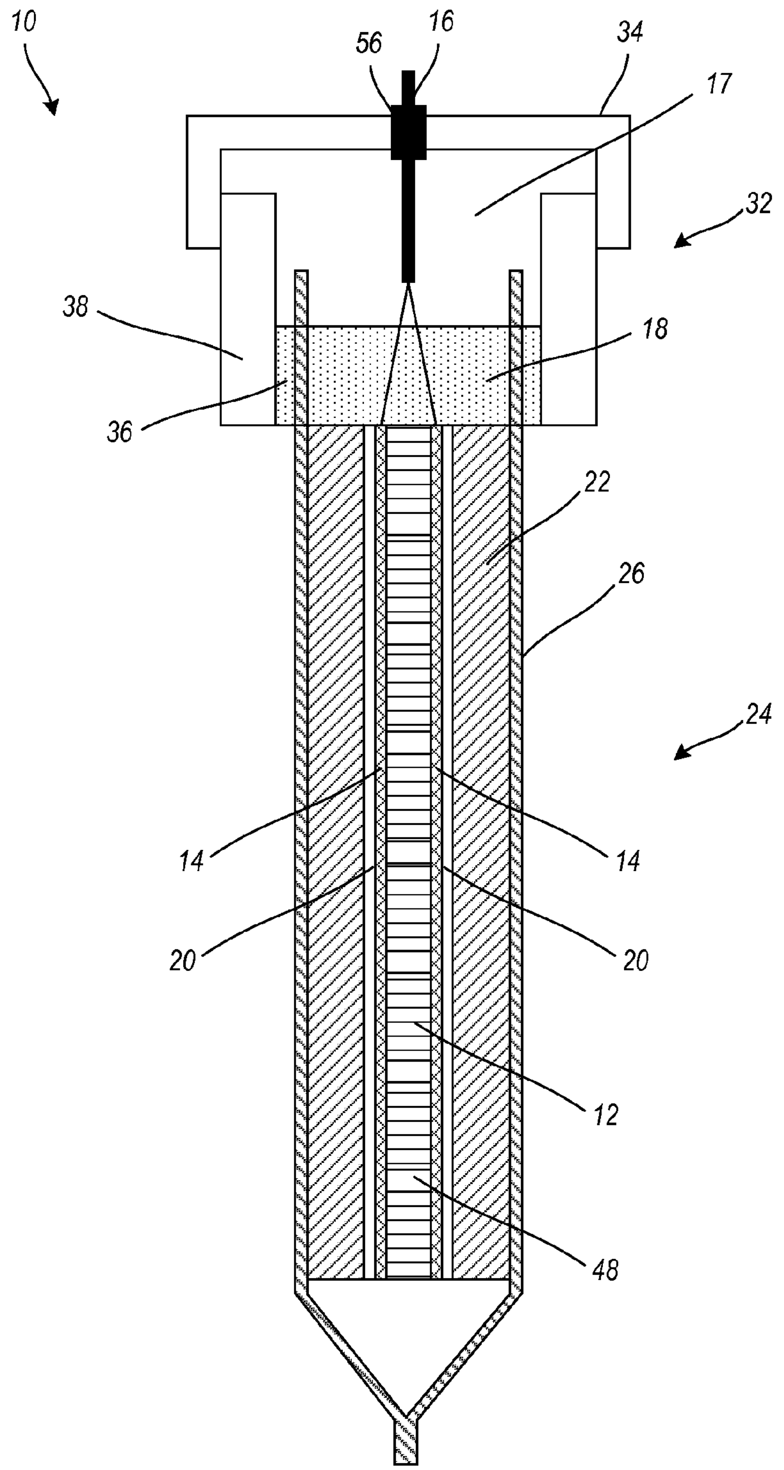
FIG. 1 is a cross-sectional view of a submersible, encapsulated heater, according to an embodiment of the technology described herein.

The submersible, encapsulated heater 10 includes at least one heating element 12 located internally. In the illustrative embodiment, the heating element 12 is a positive temperature coefficient (PTC) of resistance heating element 12. As depicted in FIG. 1, for example, six PTC heating elements 12 are shown in a generally vertical manner. Each heating element 12 disposed within the submersible, encapsulated heater 10 is replaceable and easily interchangeable. A heating element gap 48 can exist between heating elements 12 to serve as an expansion joint, thus facilitating the expansion and/or heating of the encapsulated heater 10.

In the event that the heated medium, such as a liquid, becomes depleted during the heating process, utilization of the PTC heating elements 12 provides that the heater 10 will not experience electrical shorting due to overheating or burn-out. Additionally, utilization of the PTC heating elements 12 provides that the heater 10 will not experience resistance heating effects so severe as to cause combustion. PTC heating elements 12 are designed to not exceed a maximum operating temperature of 245 degrees Celsius. It is known that PTC heating elements 12 can have very rigid, uneven surfaces.

The submersible, encapsulated heater 10 includes a pair of thin, flexible foil electrode strips 14 disposed upon opposing sides of the heating element 12. In the illustrative embodiment, the pair of thin, flexible foil electrode strips 14 is aluminum. By way of example, the pair of thin, flexible foil electrode strips 14 is configured at 0.5 inches width, 0.015 inches thickness, and running the length of the heater 10. The heating element 12 is sandwiched between the pair of thin, flexible foil electrode strips 14.

The pair of thin, flexible foil electrode strips 14 is configured for flexibility to make an intimate contact to the very rigid, uneven surfaces of each heating element 12. The flexible intimate contact allows the flexible foil electrode strips 14 to flex to make a uniform contact with the PTC heating elements 12. Lack of this uniform contact can result in arcing and product failure. The pair of thin flexible foil electrode strips 14 can be held securely against the heating element 12 with a thermoset adhesive (not shown). By way of example, the adhesive can be the heat resistant silicone adhesive XE13-A8341 manufactured by GE Toshiba Silicones Co., Ltd. The pair of thin, flexible foil electrode strips 14 is configured for connectivity to an electrical power source 16. The electrical power source 16 cable is secured to the cap 34 with a compression fit 56 to ensure a seal. The electrical elements of the heater and their respective housings are configured to withstand adverse chemical environments such that they are not deteriorated by an adverse chemical liquid into which they are placed.

The heating element 12 and the pair of thin, flexible foil electrode strips 14 are encapsulated with an inert polymer 18 in the submersible, encapsulated heater 10. As such the heater 12 is configured to be submersible. In the illustrative embodiment, the inert polymer 18 with which to encapsulate is silicone.

By way of example, in at least one embodiment, the encapsulant is GE Momentum SE6035. (See http://www.interquimica.com.br/upload/produtos/6035-6075.pdf.) The GE Momentum SE6035 product has the following salient features useful to the technology described herein: methyl vinyl silicone rubber, organic peroxide catalyzed, and durometer 35 and 70. The GE Momentum SE6035 product can utilize additives to modifying the processing and cured conditions: heat aging stabilizer, flame retardant, process aids, magnesium oxide (at approximately 1-3% to improve oil resistance), and tensile strength enhancer.

Additionally, by way of example, in at least one embodiment, the encapsulant is Dow Corning® Tough Gel 3-4207. In at least one embodiment, the encapsulant is Dow Corning® 3-4237 dielectric firm gel kit. (See http://www3.dowcorning.com/DataFiles/090007b2811f3f29.pdf, and see http://www3.dowcorning.com/DataFiles/090007c8801bb598.pdf.) In at least one embodiment, the encapsulant is the Sylgard® 528 Firm Gel Parts A & B silicone elastomer. Alternative polymers can be utilized so long as they are sufficient to seal and render the heater 10 completely submersible.

In at least one embodiment, the submersible, encapsulated heater 10 includes a polyimide film wrap 20. The polyimide film wrap 20 is wrapped around the heating element 12 and the pair of thin, flexible foil electrode strips 14 disposed upon opposing sides of the heating element 12. The polyimide film wrap 20 is configured to provide electrical insulation. The polyimide film wrap 20 aids in providing a temperature resistance of up to approximately 700 degrees Fahrenheit. The polyimide film wrap 20 can be the Kapton® polyimide film manufactured by Du Pont®.

Utilization of the inert polymer 18 and the PTC heating elements 12 provides increased assurances that the heater 10 is better protected against the arcing, shorting, insulation break-down, and heater component failure.

Figure 2:
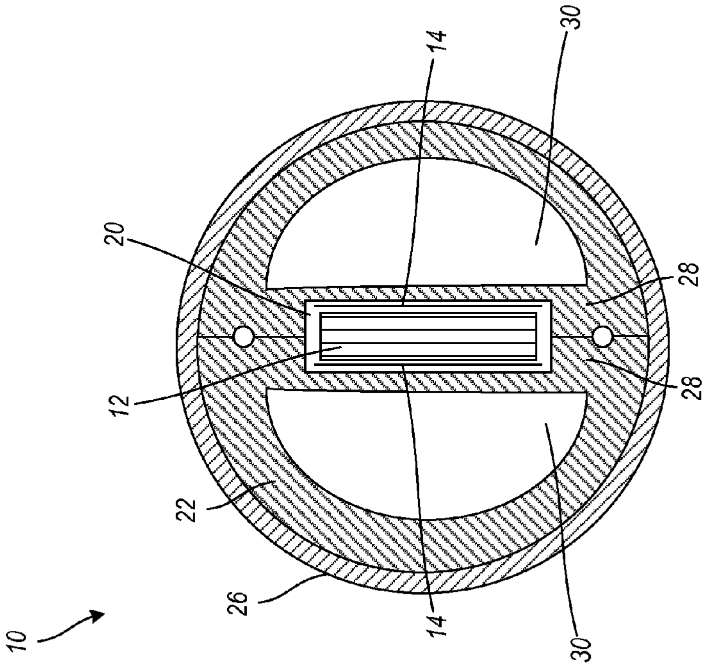
FIG. 2 is a top cross-sectional view of the submersible, encapsulated heater depicted in FIG. 1.
Figure 3:
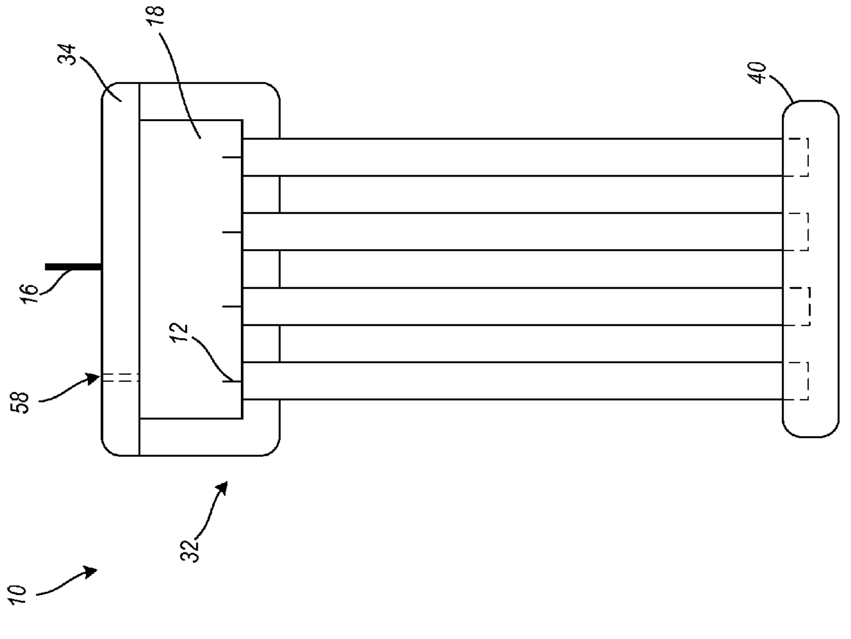
FIG. 3 is a front planar view of a submersible, encapsulated heater, according to an embodiment of the technology described herein.
Figure 4:
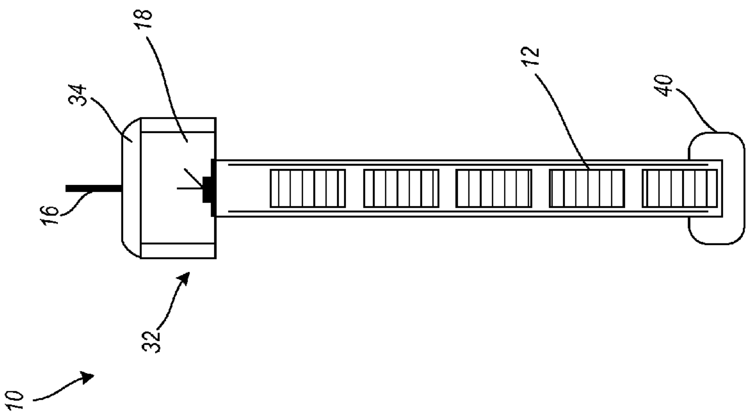
FIG. 4 a side planar view of a submersible, encapsulated heater, according to an embodiment of the technology described herein.

The submersible, encapsulated heater 10 includes a housing 24. As depicted in FIGS. 1 and 2, the housing 24 is generally tubular. The housing 24 can include an aluminum extrusion 22. The aluminum extrusion 22 forms a generally tubular, cylindrical shape having a pair of internal members 28 that surround the heating element 12 and the pair of thin, flexible foil electrode strips 14 disposed upon opposing sides of the heating element 12.

The aluminum extrusion 22 can include a pair of hollow channels 30 disposed within the extruded aluminum housing 24 and running a length of the extruded aluminum housing 24, located on opposing sides and outside of the pair of internal members 28.

In at least one embodiment, the housing 24 includes an inert polytetrafluoroethylene outer sheath layer 26, disposed upon an outermost surface of the submersible, encapsulated heater 10. The inert polytetrafluoroethylene outer sheath layer 26 can be the Teflon® brand polytetrafluoroethylene manufactured by Du Pont®. The outer sheath layer is designed to insulate and protect.

The submersible, encapsulated heater 10 also can include a cover 32 to be placed over the housing 24 at an end opposite base member 40. Base member 40 serves as a press fit assembly to hold the various vertical assemblies of heating elements 12. Additionally, base member 40 serves as a bumper to prevent the heaters from contacting a temperature sensitive surface. The cover can include a snap-on cap 34 to allow ease in access to wiring assemblies within the heater. Spacers 36 and support members 38, such as CPVC pipe, also can be utilized to secure the cover 32 to the housing 24. Within the cover 32 an epoxy 17 can be utilized to fill any gaps above the inert polymer 18 and the cover 32. The submersible, encapsulated heater 10 also can include an encapsulant pour hole 58 through which the encapsulant is poured.

Figure 5:
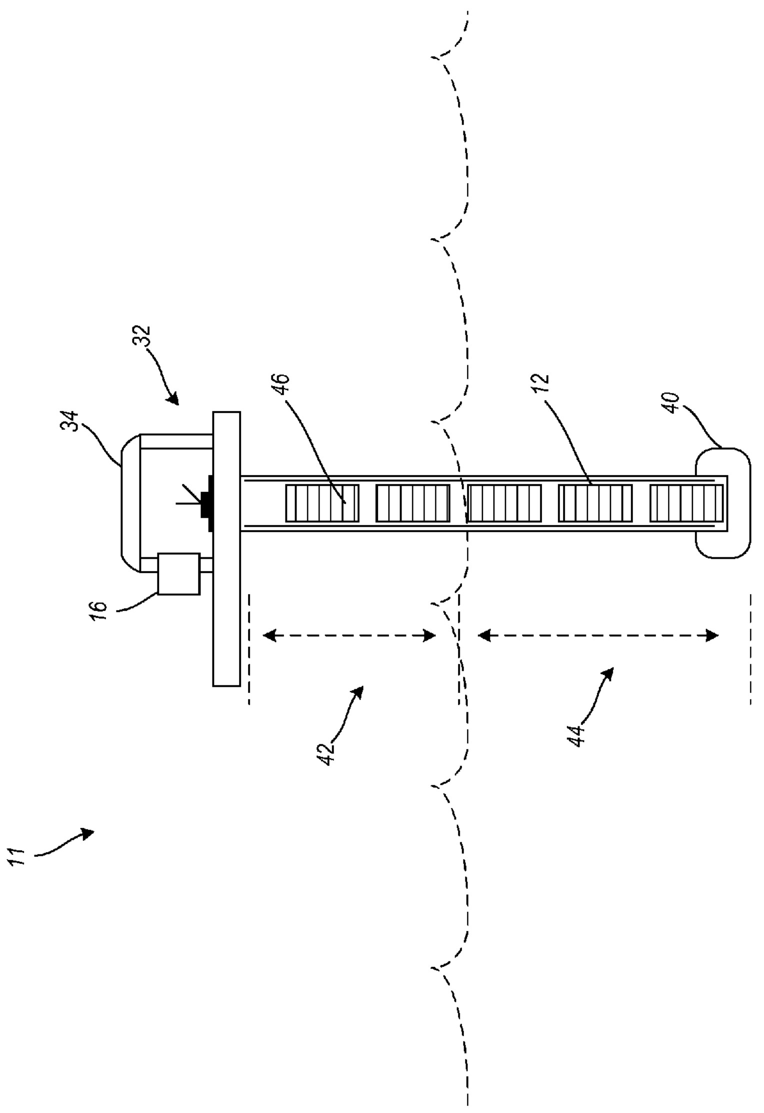
FIG. 5 is a side planar view an encapsulated heater, according to an embodiment of the technology described herein.
Figure 6:
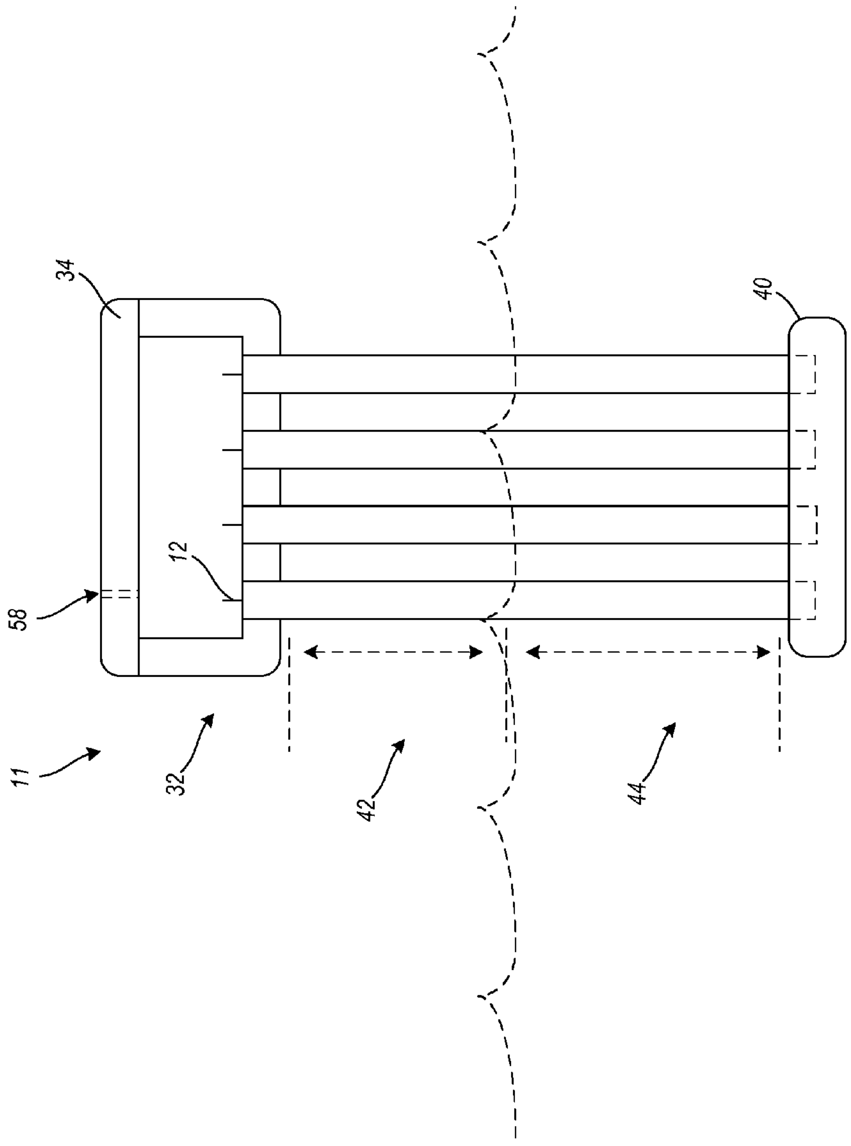
FIG. 6 is a front planar view of an encapsulated heater, according to an embodiment of the technology described herein.

Referring now to FIGS. 5 and 6, an alternative embodiment of the heater 11 is shown. This heater 11 is similar to that depicted in FIGS. 1-4, but it is only partially immersible in a liquid. Additionally, no inert polymer, or silicone gel, is utilized in the cover.

The encapsulated heater 11 includes cold zone 42 and hot zone 44. Heater 11 can be immersed partially into a liquid. The hot zone 44 represents the level in the liquid. The cold zone 42 represents the level above the liquid. In the cold zone 42 above the liquid, blank ceramics 46 can be used. These ceramics are not heated.

Figure 7:
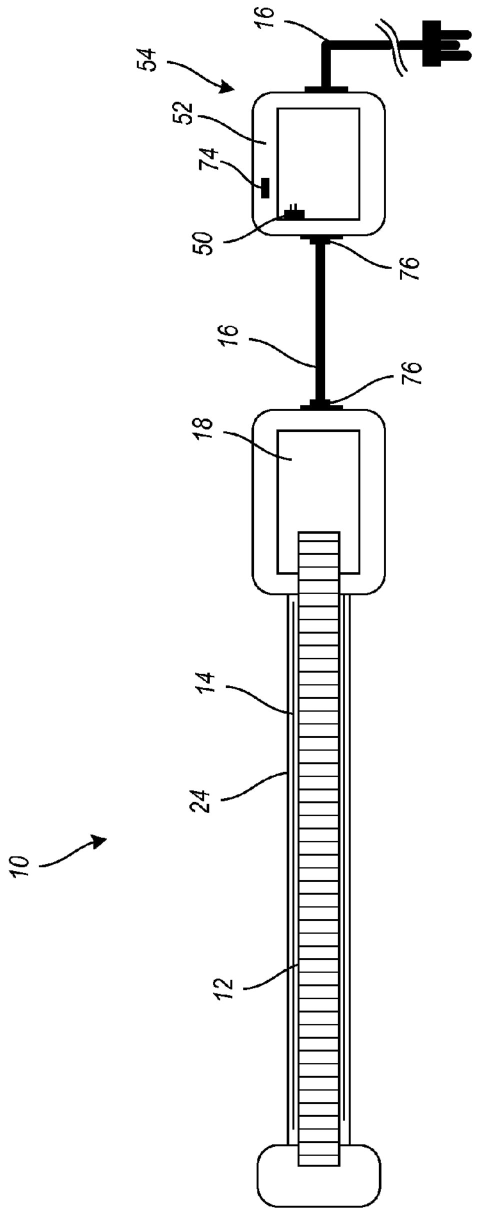
FIG. 7 is a schematic view of a submersible, encapsulated heating system having a built-in thermostat in a tethered dongle, according to an embodiment of the technology described herein.

Referring now to FIG. 7, a submersible, encapsulated heating system having a built-in thermostat 50 is shown. The submersible, encapsulated heating system having a built-in thermostat 10 can be manufactured in a size compatible for placement into a tote, drum, or the like. In this depicted embodiment, the submersible, encapsulated heater 10 is a fully submersible drum heater to be utilized in, for example, a 55-gallon drum. By way of example, the submersible, encapsulated heater 10 can be manufactured to operate in a drum wherein the heater 10 is a two-inch diameter, or in a tote wherein the heat 10 is an eight-inch diameter. The submersible, encapsulated heater 10 is configured to electrically heat a medium, such as a liquid, to a predetermined temperature and to maintain the temperature of the medium. The submersible, encapsulated heater 10 is configured to lower a viscosity of a liquid into which it is placed, thereby providing an improved dispensing of the liquid. The system 10 includes a submersible, encapsulated heater 10 and a thermostat 50 electrically coupled to the submersible, encapsulated heater 10. The thermostat 50 is encapsulated with an inert polymer 18, which can be a silicone gel. The thermostat 50 is configured for complete immersion. Operation of the submersible, encapsulated heater 10 is controlled by the thermostat 50.

The heating system having a built-in thermostat 50 also can include a submersible, encapsulated heater 10 that further includes: a heater housing 24; at least one heating element 12 disposed within the housing 24; and a pair of thin, flexible foil electrode strips 14 disposed upon opposing sides of the at least one heating element 12, configured for flexibility to make an intimate contact with a plurality of surface areas on the heating element 12, and configured for connectivity to an electrical power source 16. The heating element is a positive temperature coefficient (PTC) of resistance heating element. Alternatively, the heating element can be a metal heater. The heating element 12 can be shaped to be flat or round. The heating housing 24 can be, for example, a silicone of thickness of approximately 0.125 inches.

Within the housing 24, the heating element 12 and the pair of thin, flexible foil electrode strips 14 are encapsulated with an inert polymer 18. The heater housing 24 can be manufactured of a molded silicone. Use of silicone is beneficial in that it does not harden and it can flex in use and does not crack. Silicone is preferred over epoxy urethane. A sensor 74 can be embedded in the silicone wall.

The submersible, encapsulated heating system 10 also can include a thermostat housing 52. The thermostat housing 52 includes a silicone dongle 54 to provide chemical resistance. The silicone dongle 54 is tethered to the submersible, encapsulated heater 10 by a power cable 16. The thermostat housing can be filled with an inert polymer 18, such as silicone gel.

Operation of the submersible, encapsulated heater 10 is controlled further by the thermostat 50 to not exceed a predetermined safety temperature and thereby avoid combustion. Operation of the submersible, encapsulated heater 10 is controlled further by the thermostat 50 to not decrease below a predetermined safety temperature and thereby avoid freezing.

The heater housing 24 and the thermostat housing 50 are configured for placement into a liquid having a chemically reactive property.

In operation, the submersible, encapsulated heating system having a built-in thermostat 50 in a tethered dongle 54 can be utilized in a drum, for example, to ensure that the contents are maintained at a predetermined temperature.

Figure 8:
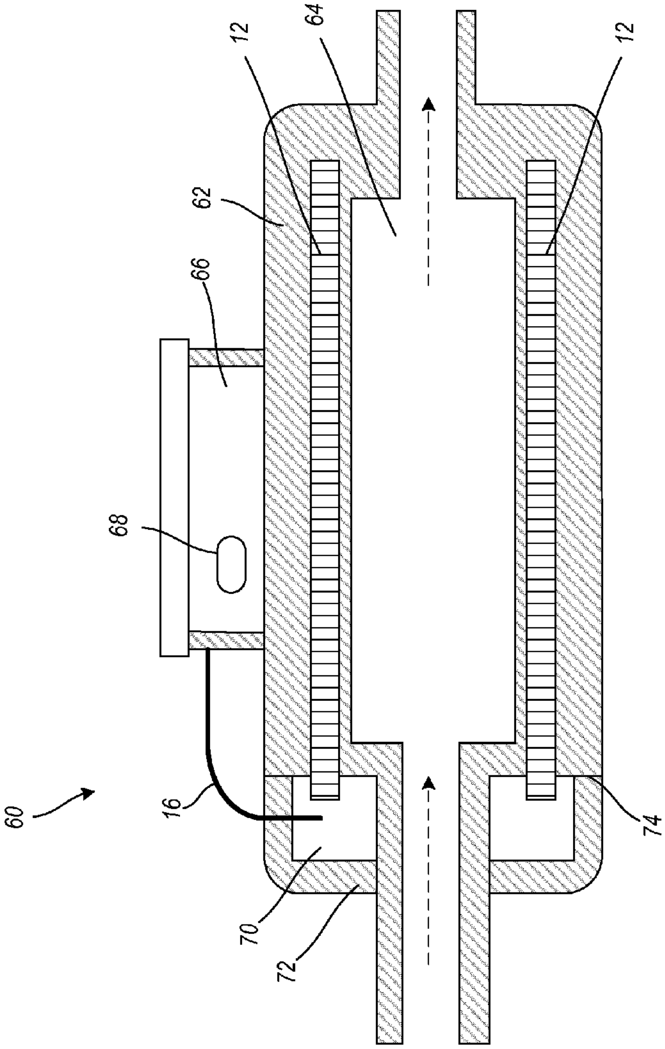
FIG. 8 is a schematic view of an encapsulated heat exchanger having flow-through heating, according to an embodiment of the technology described herein.
Figure 9:
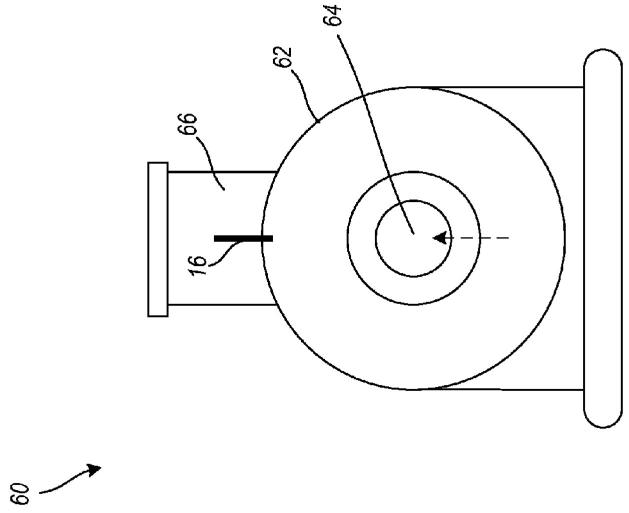
FIG. 9 is an end view of the encapsulated heat exchanger having flow-through heating depicted in FIG. 8.

Referring now to FIGS. 8 and 9, an encapsulated heat exchanger having flow-through heating 60 is shown. The encapsulated heat exchanger 60 having flow-through heating is waterproof and compatible for use indoors and outdoors. The heat exchanger 60 includes a heat exchanger housing 62 having a flow-through chamber 64 configured to heat a liquid to a predetermined temperature. At least one heating element 12 is disposed within a wall of the heat exchanger housing 62 surrounding the flow-through chamber. The heating element 12 is a positive temperature coefficient (PTC) of resistance heating element. The heat exchanger 60 is encapsulated and fully submersible.

The encapsulated heat exchanger 60 having flow-through heating is configured to provide efficient heat transfer from the at least one heating element 12 disposed within a wall of the flow-through chamber 64 to the liquid in the flow-through chamber 64.

In operation, the liquid to be heated does not come into a contact with the heating element 12 disposed within a wall of the flow-through chamber 64. The encapsulated heat exchanger 60 operates such that no physical contact is made between a heating element 12 and the liquid passing through.

The housing 62 and wall of the flow-through chamber 64 can include an inert polymer silicone to provide chemical resistance. The encapsulated heat exchanger is configured for placement into a liquid having a chemically reactive property.

The encapsulated heat exchanger 60 having flow-through heating can also include a digital control unit 66 integrally formed with the flow-through chamber 64 of the heat exchanger housing and configured to provide control to the heat exchanger 60. Operation of the encapsulated heat exchanger 60 can be controlled further by the digital control unit 66 to maintain a specific temperature. Operation of the encapsulated heat exchanger 60 can be controlled further by the digital control unit 66 to not exceed a predetermined safety temperature and thereby avoid combustion. In at least one embodiment, the digital control unit 66 also includes ground fault 68.

A heat exchanger cap 72 covers the housing 62 with a sealable ring 74. Wiring cavity 70 having is therefore water proof. Cap 72 is easily removed such that the elements contained internally within the heat exchanger 60, such as a heating element 12, can be exchanged.

In operation, the encapsulated heat exchanger 60 can be utilized in swimming pools and spas. Additionally, the encapsulated heat exchanger 60 can be utilized in chlorinated pools and spas and the like.

Figure 10:
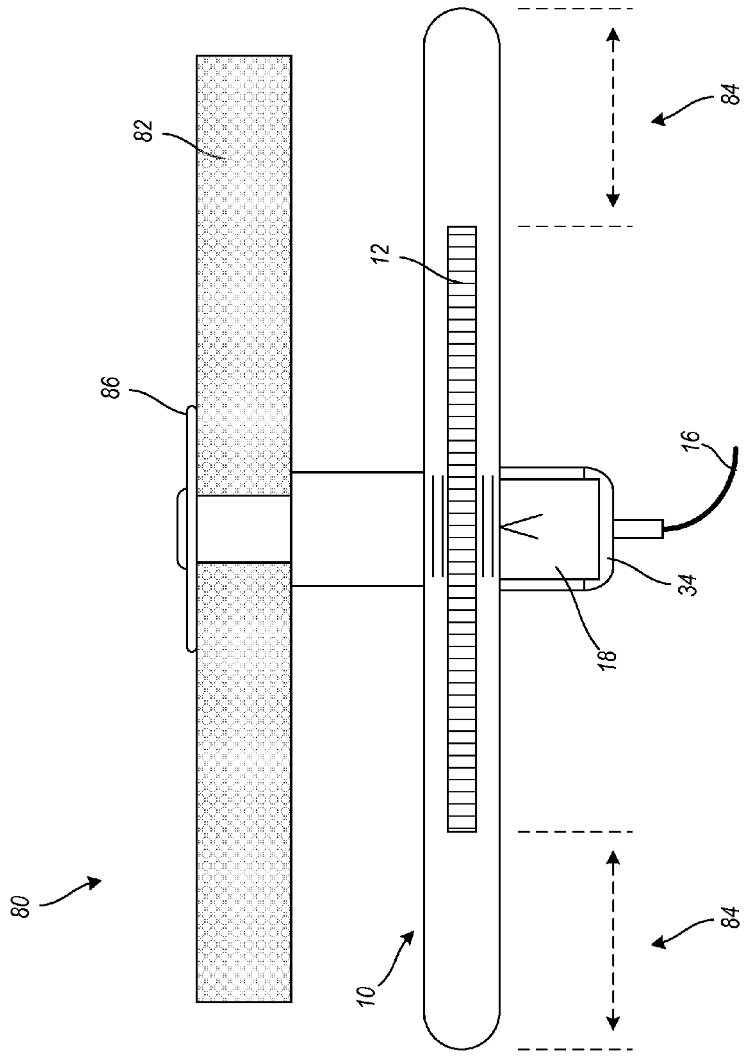
FIG. 10 is a schematic view of a liquid floating encapsulated heater, according to an embodiment of the technology described herein.

Referring now to FIG. 10, a liquid floating encapsulated heater 80 is shown. The liquid floating encapsulated heater 80 includes: a submersible, encapsulated heater 10; a float 82 coupled to the submersible, encapsulated heater 10 and under which the submersible, encapsulated heater 10 is suspended; and an indoor/outdoor liquid-proof power cable 16 and navigation tether coupled to the submersible, encapsulated heater 10. The submersible, encapsulated heater 10 can be coupled to the float 82 and secured with a PVC disc 86. The float 82 can be designed with a specific shape in mind to fit the environment in which it is placed. By way of example, the float 82 can be formed in the shape and color of a lily pad such as that floating in a coy pond.

The submersible, encapsulated heater 10 is configured to electrically heat a medium to a predetermined temperature and to maintain the temperature of the medium. The submersible, encapsulated heater 10 can be encapsulated in silicone. The float 82 can be a float with a property of resistance to ultraviolet light. The indoor/outdoor liquid-proof power cable 16 and navigation tether can be a 14 gage SJTOW cable. The liquid floating encapsulated heater further can include a ground fault plug (not shown) disposed within the indoor/outdoor liquid-proof power cable 16. The submersible, encapsulated heater 10 can further include at least one no-heat zone 84.

The liquid floating encapsulated heater 80 can also include a heater having a heater housing; at least one heating element 12 disposed within the housing; and a pair of thin, flexible foil electrode strips disposed upon opposing sides of the at least one heating element, configured for flexibility to make an intimate contact with a plurality of surface areas on the at least one heating element, and configured for connectivity to an electrical power source 16. The heating element 12 is a positive temperature coefficient (PTC) of resistance heating element. Within the housing, the heating element 12 and the pair of thin, flexible foil electrode strips are encapsulated with an inert polymer 18.

The submersible, encapsulated heater 10 is configured for placement in a liquid in which the level of the liquid fluctuates. The submersible, encapsulated heater 10 is configured for deicing.

The liquid floating encapsulated heater 10 can further include an aesthetically pleasing decorative display (not shown) configured for placement directly upon the float 82 such that the liquid floating encapsulated heater 80, within the liquid into which it is placed, is generally and visually disguised from above.

In each of the heater systems provided above, with the exception of the floating heater depicted in FIG. 10, metal heaters can be utilized. Metal heaters can not be utilized with the floating heater embodiment due to the fact that the density of the metal working against the buoyancy of the heater.

When a metal heater is utilized, the metal is carefully chosen to avoid the potential for oxidation and corrosion. Certain metals intrinsically possess non-conductive coatings by virtue of their oxide layer. For example, aluminum, titanium, and stainless steel are suitable choices. These metals are non-conductive, have durable oxide layers, and work well in most liquid environments, with the exception of highly reducing, oxygen-poor environments.

The material selected to encapsulate the heater can be selected from a variety of materials. The choice of the material is likely to be dependent upon the nature of the liquid into which the heater is immersed. For example, the encapsulant can include metal, polymer, inert polymer, and the like. Although mild steel would exhibit corrosion in some liquids, it would be suitable for use in the heating of oil, for example.

A silicone polymer can be utilized to encapsulate the heater. A range of silicones provide a thermally stable and chemically inert coating materials for heater used in a wide range of environments. The silicone polymers used to encapsulate the heating elements 12 are designed to be thermally stable at a maximum operating temperature of 245 degrees Celsius.

A key feature of the successful performance of the heater assemblies described herein is the method of attachment by which the PTC heating elements are brought into intimate contact with the foil strips located on the sides of the PTC heating elements.

It was noted that when the foil and the PTC were brought into intimate electrical contact with one another by pressure resulting from compression fitting or the shrinkage of an outer protective sheath that the tolerances of the multiplicity of PTC heating elements was not adequate to ensure effective electrical contact. This issue causes electrical breakdown and failure of heaters.

By applying a heat-curable silicone adhesive to one or both surface of the PTC heating elements and each of the foil strips a very effective bond is achieved between the two surfaces without compromising the electrical conductivity between the two respective elements. The heat-curable silicone adhesive should be chosen in such a way that it is suitable for use with a variety of metals, in particular aluminum foil and a silver/platinum coating on the electrode sides of the PTC heating elements. The high temperature stability of this silicone adhesive is sealing and bonding applications with a continuous service temperature of 245 degrees Celsius is essential to the successful selection of this adhesive grade. By way of example, the adhesive can be the heat resistant silicone adhesive XE13-A8341 manufactured by GE Toshiba Silicones Co., Ltd.

Adhesive application provides integrity of the components in the heater assembly and both thermal and electrical conductivity between the PTC heating elements and the foil strips.

PTC heating elements surfaces are known to be rough due, in particular, to a silver/platinum coating, or the like, that has been applied. The rough surface includes many peaks and valleys. This rough surface on the PTC heating element is coated with sufficient adhesive to bring the two components into electrical contact with one another but is sparingly applied to allow contact between the peaks and the foils strips, providing electrical contact.

A method for heating is provided. The method for heating includes: utilizing at least one heating element, wherein the heating element is a positive temperature coefficient (PTC) of resistance heating element; attaching a pair of thin, flexible foil electrode strips on opposing sides of the at least one heating element; utilizing a heat-curable silicone adhesive to secure contact of the pair of thin, flexible foil electrode strips to the at least one heating element; and providing a pressure on the pair of thin, flexible foil electrode strips to contact with the at least one heating element. An intimate contact is made by pressure between the pair of thin, flexible foil electrode strips and the at least one heating element. Electrical conductivity between the pair of thin, flexible foil electrode strips and the at least one heating element is maintained. Thermal conductivity between the pair of thin, flexible foil electrode strips and the at least one heating element is maintained.

In operation, the heater assemblies and the methods described herein can be utilized in numerous applications. By way of example, the heater systems and methods can be used in water and chemical related applications including: waste treatment, chemical storage, car wash filtration to avoid freezing, septic tanks (in cold climates), and in bio-Diesel applications.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosed technology and are intended to be covered by the following claims.

What is claimed is:

1. A submersible, encapsulated heater comprising:

a housing;

at least one heating element disposed within the housing, wherein the heating element is a positive temperature coefficient (PTC) of resistance heating element; and a pair of thin, flexible foil electrode strips disposed upon opposing sides of the at least one heating element, configured for flexibility to make an intimate contact with a plurality of surface areas on the at least one heating element, and configured for connectivity to an electrical power source;

wherein, within the housing, the at least one heating element and the pair of thin, flexible foil electrode strips are encapsulated;

wherein the heater is submersible;

wherein the submersible, encapsulated heater is configured to electrically heat a medium to a predetermined temperature and to maintain the temperature of the medium.

2. The submersible, encapsulated heater of claim 1, wherein the pair of thin flexible foil electrode strips is held securely against the at least one heating element with a thermoset adhesive.

3. The submersible, encapsulated heater of claim 1, wherein the at least one heating element disposed within the submersible, encapsulated heater is replaceable.

4. The submersible, encapsulated heater of claim 1, wherein the pair of thin, flexible foil electrode strips is comprised of aluminum strips.

5. The submersible, encapsulated heater of claim 1, wherein the housing is generally tubular.

6. The submersible, encapsulated heater of claim 1, further comprising:

a polyimide film wrap, wherein the polyimide film wrap is wrapped around the at least one heating element and the pair of thin, flexible foil electrode strips disposed upon opposing sides of the at least one heating element, and wherein the polyimide film wrap is configured to provide an electrical insulation.

7. The submersible, encapsulated heater of claim 1, further comprising:

an inert polytetrafluoroethylene outer sheath layer, disposed upon the housing of the submersible, encapsulated heater.

8. The submersible, encapsulated heater of claim 1, wherein, within the housing, the at least one heating element and the pair of thin, flexible foil electrode strips are encapsulated with an inert polymer.

9. The submersible, encapsulated heater of claim 1, wherein the housing is comprised of an extruded aluminum, and wherein the extruded aluminum forms a generally tubular, cylindrical shape having a pair of internal members that surround the at least one heating element and the pair of thin, flexible foil electrode strips disposed upon opposing sides of the at least one heating element.

10. The submersible, encapsulated heater of claim 9, further comprising:

a pair of hollow channels disposed within the extruded aluminum housing and running a length of the extruded aluminum housing, located on opposing sides and outside of the pair of internal members.

11. A method for heating comprising:

utilizing at least one heating element, wherein the heating element is a positive temperature coefficient (PTC) of resistance heating element;

attaching a pair of thin, flexible foil electrode strips on opposing sides of the at least one heating element;

utilizing a heat-curable silicone adhesive to secure contact of the pair of thin, flexible foil electrode strips to the at least one heating element; and providing a pressure on the pair of thin, flexible foil electrode strips to contact with the at least one heating element;

wherein an intimate contact is made by pressure between the pair of thin, flexible foil electrode strips and the at least one heating element wherein electrical conductivity between the pair of thin, flexible foil electrode strips and the at least one heating element is maintained; and wherein thermal conductivity between the pair of thin, flexible foil electrode strips and the at least one heating element is maintained.

* * * * *